Nov. 12, 1935.  A. W. PUDDINGTON  2,020,516

COMBUSTION CONTROL SYSTEM

Filed July 10, 1929  3 Sheets—Sheet 1

INVENTOR.
Arthur W. Puddington
BY Barlow & Barlow
ATTORNEYS.

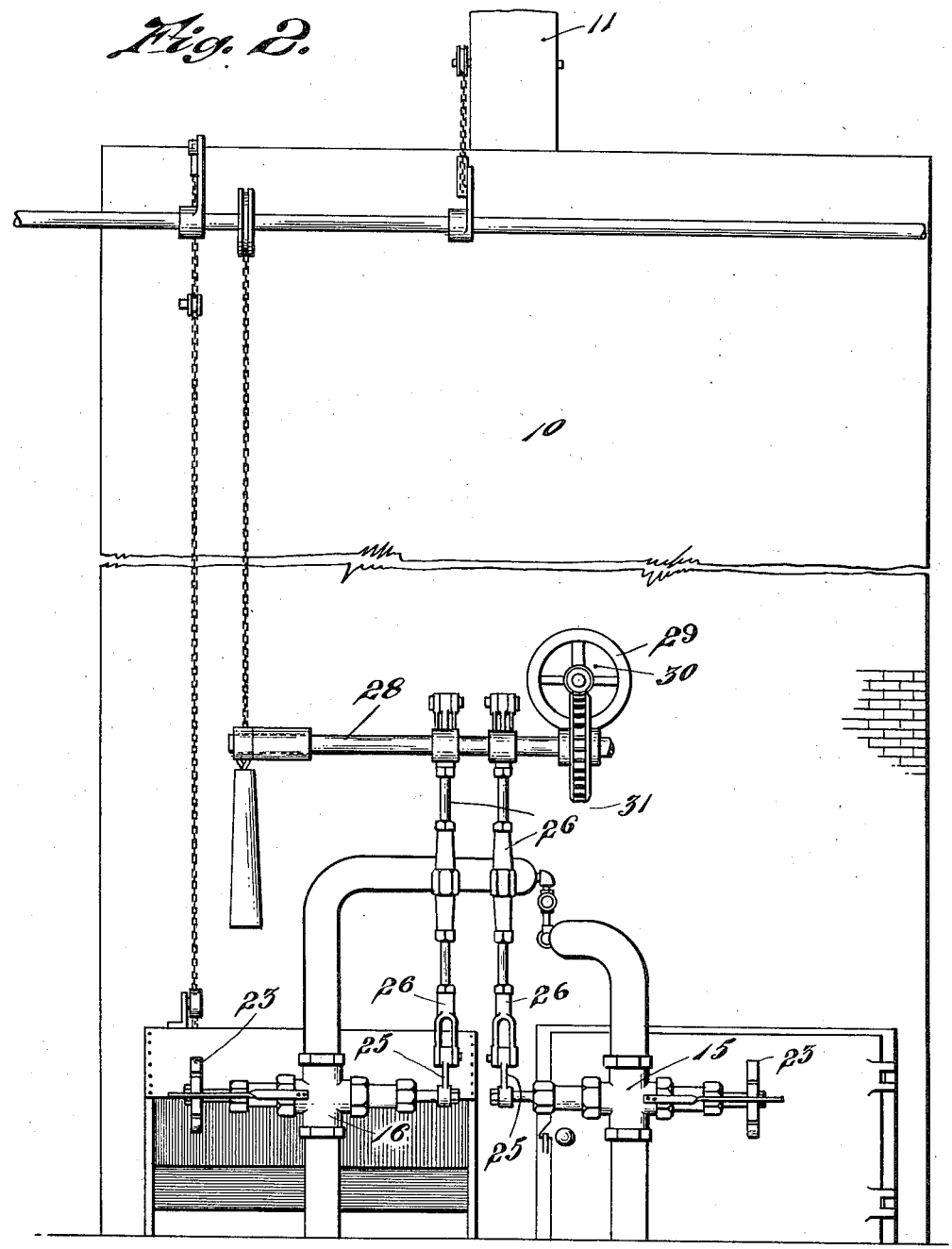

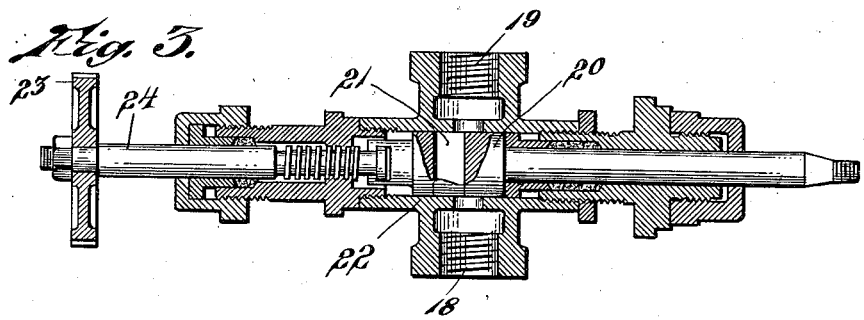
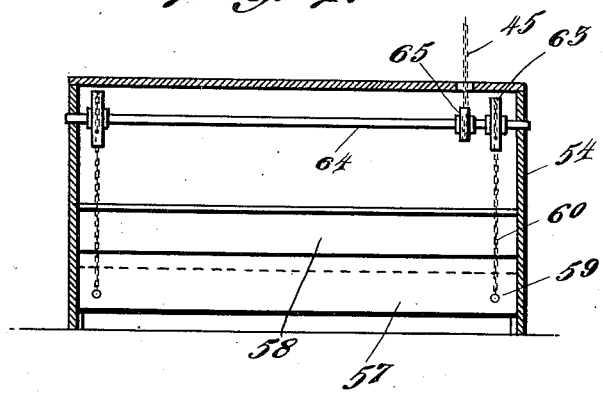
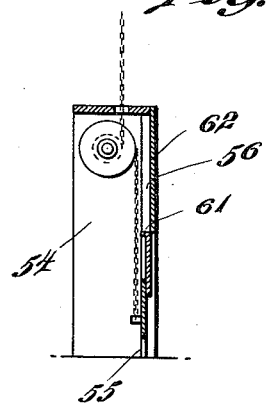
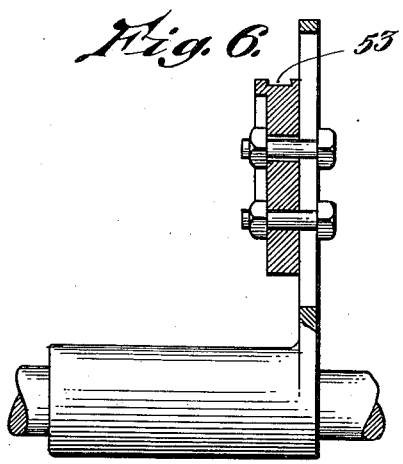
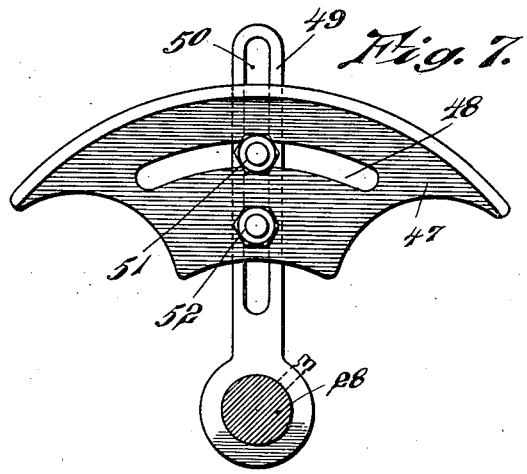

Patented Nov. 12, 1935

2,020,516

UNITED STATES PATENT OFFICE 2,020,516

COMBUSTION CONTROL SYSTEM

Arthur W. Puddington, Providence, R. I., assignor to E. John Lownes, Jr., Providence, R. I.

Application July 10, 1929, Serial No. 377,225

6 Claims. (Cl. 236—26)

My present invention relates to the regulation of steam boilers, and has particular reference to oil-fired steam boilers.

One object of the present invention is to provide a method and an apparatus for controlling combustion conditions within the boiler furnace.

A second object is to maintain high operating efficiency by limiting preventable heat loss in the waste chimney gases to a minimum.

A third object is to provide a control method and apparatus for automatically maintaining the same correct proportion of air supply volume to fuel supply volume for every rate of combustion.

A fourth object is to provide a control apparatus which is adjustable to permit variation to compensate for variable factors affecting the fuel and air flow under local conditions of operation.

A fifth object is to provide exact regulation for a battery of boilers, each individual boiler control having independent adjustments for initial setting.

Other objects and advantageous features will be apparent from the detailed description following in conjunction with the accompanying drawings, and will be particularly pointed out in the appended claims.

In the drawings, Figure 1 represents a side elevation of the control apparatus as applied to one of a battery of boilers, the boilers being in parallel relation;

Figure 2 is a front elevation, the control panel board being removed to show the relative valve positions;

Figure 3 is a sectional view of the oil and steam valves;

Figures 4 and 5 are views, partly in section, of the air valve and the operating mechanism therefor; and Figures 6 and 7 are detail side and elevation views, partly in section, of the novel adjustable segment.

Figure 1:
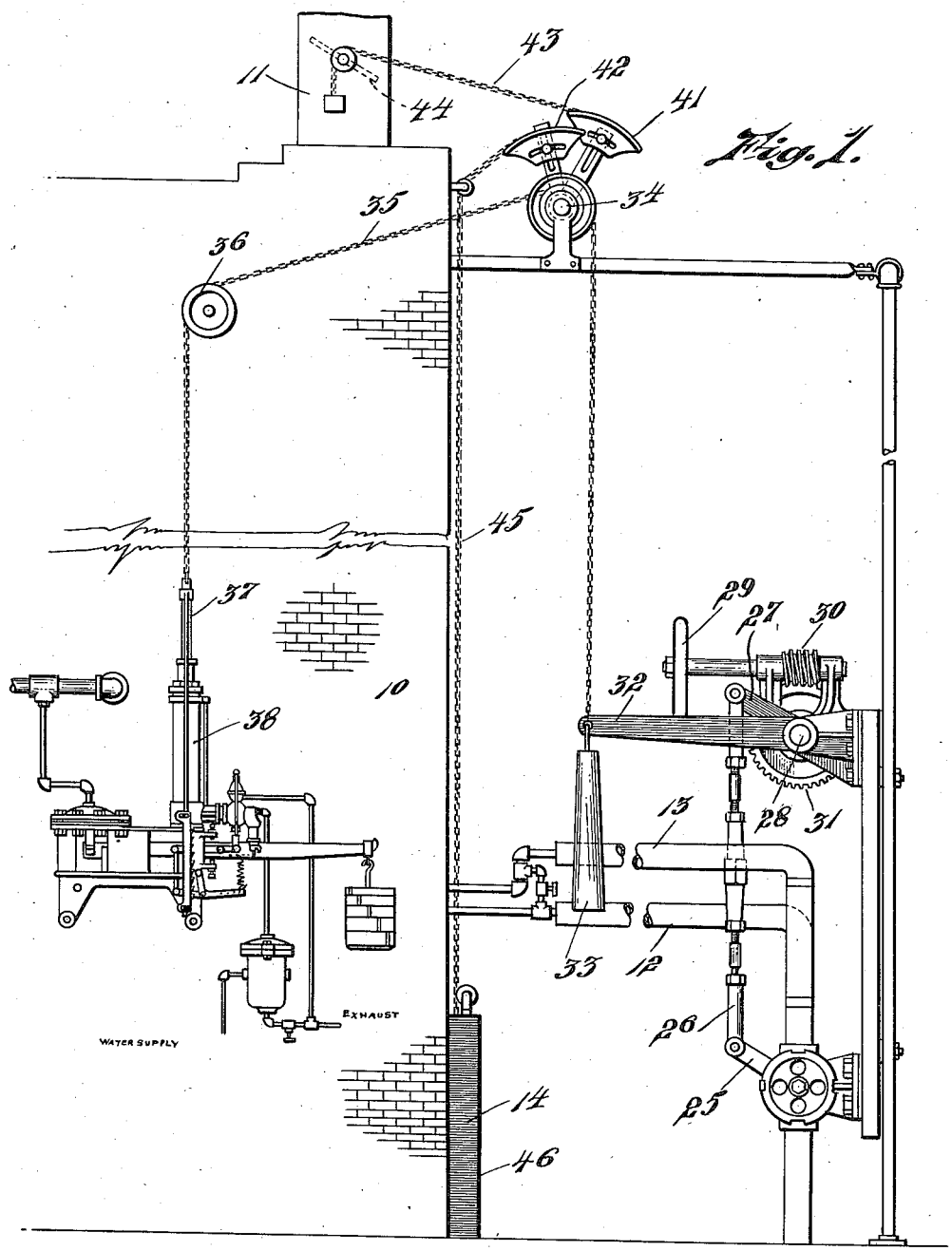

With complete combustion of the fuel:

The efficiency of a boiler and furnace in producing steam is determined by the percentage of the total heat produced in the furnace that is actually used in the boiler to produce steam. If too much air is supplied to the furnace there will be a corresponding increase in the volume of waste chimney gases per unit of fuel burned with a substantial increase in the preventable loss of heat robbed from the boiler and carried out the chimney. In the average boiler plant lacking careful and constant regulation of the furnace air supply, this loss represents the largest fuel waste in steam production.

Since complete combustion in a boiler furnace is not necessarily efficient combustion, the problem of maintaining the highest practicable furnace efficiency is essentially a problem of reducing the heat loss up the chimney to the minimum that operating conditions will permit, by reducing the percentage of excess air in the furnace gases to the lowest point consistent with complete combustion of the fuel. This includes an initial proportioning of the fuel and air supplies to produce the highest attainable combustion efficiency and maintenance of the same correct proportions at all rates of combustion. This is almost impossible to attain by hand regulation, especially with a variable load.

I have devised a method for accomplishing this desired result and designed apparatus permitting a practically uniform straight line automatically adjustable flow of oil and air to the furnace and synchronizing the air flow with the oil flow in the exact volumetric proportion desired, so that any change in the volume of oil supplied to the furnace is simultaneous with a corresponding change in the volume of air to maintain a fixed ratio between oxygen and combustible, determined in the initial setting; and I provide adjustments for initial setting of the oil and air supplies to suit the needs of each individual boiler. The following is a detailed description of my novel method and of one embodiment of a control structure which may be used to carry out the novel method.

Referring to the drawings, the numeral 10 designates a boiler, which may be, and preferably is, one of a battery of boilers connected in parallel, equipped with the usual stack 11, an oil supply pipe 12, a steam supply pipe 13, and an air inlet or an air inlet pipe 14.

As will be noted from Figure 1, the oil valve 15 and the steam valve 16 are mounted on a panel 17; each valve, as shown in Figure 3, has an inlet 18 and an outlet 19, and a valve plug 20 having a rectangular slot 21 which may be rotated within the annular valve seat 22, or manually reciprocated to adjust the flow passage by means of the hand wheel 23. The valves are therefore of the "straight line" type, as every uniform movement of the valve in response to a step change of the regulator, as hereinafter described, produces a uniform change in the flow volume, within the working range.

The valves 15 and 16 each has a stem 24 to which the rocker arms 25 are keyed, each rocker arm being rotated by movement of a vertical, adjustable link 26 which in turn is moved by a rocker arm 27 keyed to a shaft 28; a hand wheel 29, geared to shaft 28 by means of worm 30 and worm gear 31, serves as an emergency hand control, the gear 31 being normally loose on the shaft 28, but being keyed thereto by a pin connection (not shown) of any desired type, when the emergency hand control is needed. Keyed to the shaft 28 is a lever 32 having a depending weight 33, and movable as hereinafter described.

A master control shaft 34 is horizontally mounted in front of the boiler 10, or the boilers in the battery, as the case may be, and is rotated by a chain 35 passing over an idler pulley 36 and secured to the movable rod 37 of a regulator 38, which operates in the usual manner in response to fluctuations of steam pressure or temperature. The type of regulation preferred for use in the novel control system moves by steps, rather than continuously, to prevent a hunting action of the regulator.

Secured to the control shaft 34 is a pulley 39, a chain 40 connecting the pulley 39 to the lever 32 for joint movement, thus controlling the valves 15 and 16. Two pulley segments 41, 42 are keyed to the shaft 34, one segment being operatively connected by a chain 43 to the draft damper 44, and the other segment being connected by a chain 45 to the air valve 46.

As will be noted from Figures 6 and 7, each pulley segment includes an arcuate section 47, having an arcuate slot 48 therein, and a radial link 49, keyed to the master control shaft, and having a radial slot 50 therein. Two bolts, 51, 52, permit radial and lateral movement of the segment with respect to the shaft, and thus permit any necessary adjustment of the air valves and flue damper desired. The air valve and flue damper are therefore adjustable so as to synchronize with the relatively fixed movement of the oil valve thus changing the volume of air in exact proportion to the change in volume of oil and resulting in a straight line relative variation. The segments each has a peripheral groove 53 for receiving the operating chain.

Referring to Figures 4 and 5 the air valve 46 comprises a rectangular box 54 having grooves 55, 56 in each side thereof; mounted in these grooves 55, 56 are two movable plates 57, 58, the lower plate 57 having eyes 59 to which operating chains 60 are attached, the upper plate 58 having a lip 61 which is engaged by the top of plate 57 on upward movement thereof to move both plates on continued upward movement of plate 57, into the housing formed by the outer plate 62. Each chain 60 is secured to a pulley 63, keyed to a shaft 64, which shaft is rotated by a pulley 65 keyed thereon, and rotated in turn by the chain 45.

The operation of my improved control system is as follows:—

As shown in Figure 1, the steam valve is set to open slightly before the oil valve, in order to assure proper atomizing and adjusted to supply the desired ratio of steam to oil.

Each step movement of the regulator, transmitted to the master shaft, produces a fixed and uniform movement of the steam and oil valves and a uniform change in the flow of steam and oil.

The air valve control segment 42 is adjusted to produce a uniform change in the air flow for each step movement of the regulator, by a compensating movement of the air valve.

The damper control segment 41 is adjusted to produce a uniform change in draft for each step movement of the regulator and not a uniform movement of the damper.

The air flow is adjusted to the oil flow in the correct volumetric proportion to obtain the desired efficiency and $CO_2$ percentage.

With the initial adjustments thus made to obtain a desired efficiency of combustion, the control system will maintain the same efficiency at all rates of combustion, as the valve variations are in absolute synchronism, both of time and of proportionate volume of flow. Each step movement of the regulator produces a fixed change in the oil and steam flow, and a corresponding proportionate change in the air flow and in the flue damper position, thus keeping the ratio of air and oil the same.

The novel method and apparatus therefore produces the improved regulation in a simpler, less expensive and more satisfactory way, as all diaphragms, springs and other delicate mechanisms are eliminated, thus increasing the durability and lessening the need for attention and repairs.

While I have described one specific embodiment of my invention, it is clear that such changes and variations in the method and the apparatus, and such adaptations of the method and apparatus to other types of furnaces, as may be desired, may be made, within the scope of my invention as defined in the appended claims.

I claim:

1. In a boiler control system, a fuel supply inlet pipe, an air supply inlet opening, a regulator movable in response to changes in steam pressure, a shaft operatively connected to said regulator for movement therewith, valves to control said pipe and opening, a pulley on said shaft, mechanism connecting the valve in said oil inlet pipe for movement in unison with said pulley, an eccentrically adjustable pulley member on said shaft, and mechanism connecting the control for said air inlet opening for movement in unison with said pulley member.

2. In a boiler control system, a fuel supply inlet pipe, a steam supply inlet pipe, an air supply inlet opening, a flue gas outlet pipe, a regulator movable in response to changes in steam pressure, a shaft operatively connected to said regulator for movement therewith, valves in said pipes, a pulley on said shaft, mechanism connecting said pulley to the fuel and steam valves for movement in unison therewith, eccentrically adjustable pulley members on said shaft, and mechanism connecting said members to the air and flue gas valves for variable movement in unison therewith to maintain a fixed proportionate flow of air in relation to fuel.

3. In a boiler control system, a fuel supply inlet pipe, an air inlet, a flue gas outlet pipe, a damper therein, a valve in said fuel supply pipe, a regulator movable in response to changes in steam conditions, a shaft operatively connected to said regulator for movement therewith, a pulley on said shaft, mechanism connecting said valve for movement in unison with said pulley, an eccentrically adjustable pulley member on said shaft, and mechanism connecting said damper for movement in unison with said pulley member, whereby the draft is controlled to maintain a uniform change in air supply for each uniform change in the fuel supply.

4. In a boiler control system, a furnace, means for supplying fuel thereto, means for controlling said fuel supply, means for controlling a supply of air to said furnace, a regulator movable in response to changes in steam conditions, a shaft operatively connected to said regulator for movement therewith, mechanism connecting said fuel control to said shaft, an eccentrically adjustable pulley segment on said shaft, and means trained over said pulley segment and connected to said air supply control for moving in unison said controls in different or varied amounts.

5. In a boiler control system, a furnace, means for supplying fuel thereto, means for controlling said fuel supply, means for controlling supply of air to said furnace, a regulator movable in response to changes in steam conditions, a shaft operatively connected to said regulator for movement therewith, mechanism connecting said fuel control to said shaft, an arm on said shaft, an eccentrically adjustable pulley segment on said arm, and means trained over said pulley segment and connected to said air supply control for moving in unison said controls in different or varied amounts.

6. In a boiler control system, a furnace, means for supplying fuel thereto, means for controlling said fuel supply, means for controlling a supply of air to said furnace, a regulator movable in response to changes in steam conditions, a shaft operatively connected to said regulator for movement therewith, mechanism including an eccentrically adjustable pulley segment on said shaft, and means controlled by said pulley segment and connected to one of said controlling means for moving in unison said controls in different or varied amounts.

ARTHUR W. PUDDINGTON.